(12) United States Patent
Shin

(10) Patent No.: US 9,399,293 B2
(45) Date of Patent: Jul. 26, 2016

(54) METHOD AND SYSTEM FOR CALCULATING WEIGHT AND CENTER OF GRAVITY OF OBJECT LIFTED BY ROBOT

(71) Applicant: Hyundai Motor Company, Seoul (KR)

(72) Inventor: Wan Jae Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 14/501,586

(22) Filed: Sep. 30, 2014

(65) Prior Publication Data
US 2015/0360368 A1 Dec. 17, 2015

(30) Foreign Application Priority Data
Jun. 11, 2014 (KR) .................. 10-2014-0070965

(51) Int. Cl.
*B25J 9/18* (2006.01)
*B25J 9/16* (2006.01)
*B25J 13/08* (2006.01)

(52) U.S. Cl.
CPC .............. *B25J 9/1638* (2013.01); *B25J 13/082* (2013.01); *G05B 2219/35124* (2013.01); *G05B 2219/39062* (2013.01); *G05B 2219/39224* (2013.01); *G05B 2219/39498* (2013.01); *G05B 2219/40549* (2013.01); *G05B 2219/40606* (2013.01)

(58) Field of Classification Search
CPC ...... B25J 9/1638; B25J 13/082; B25J 13/085; B25J 13/088; G05B 2219/35124; G05B 2219/37357; G05B 2219/39498; G05B 2219/40549; G05B 2219/40606
See application file for complete search history.

(56) References Cited

U.S. PATENT DOCUMENTS

| | | | |
|---|---|---|---|
| 8,271,138 B2 | 9/2012 | Eliuk et al. | |
| 2013/0061695 A1* | 3/2013 | Sato | B25J 13/085 73/865 |
| 2014/0188277 A1* | 7/2014 | Lee | B25J 15/0033 700/258 |

(Continued)

FOREIGN PATENT DOCUMENTS

| | | | | |
|---|---|---|---|---|
| EP | 1076228 A1 * | 2/2001 | | G01G 3/16 |
| JP | 01260324 A * | 10/1989 | | |

(Continued)

OTHER PUBLICATIONS

Jazar, R.N., "Acceleration Kinematics", Chaper 10 in Theory of Applied Robotics, 2nd ed., © Springer Science+Business Media, LLC, 2010, pp. 529-579.*

(Continued)

*Primary Examiner* — Behrang Badii
*Assistant Examiner* — David Testardi
(74) *Attorney, Agent, or Firm* — Mintz Levin Cohn Ferris Glovsky and Popeo, P.C.; Peter F. Corless

(57) ABSTRACT

A method for calculating weight and center of gravity of an object lifted by a robot includes lifting an object, measuring a change in angle of each joint through an angle sensor provided for each joint of the gripper in the event of the lifting, and calculating angular velocity and acceleration of each joint, calculating, via a controller, acceleration of the object, measuring an upper pressing force and a lower pressing force using force sensors installed on the joints, and calculating, via the controller, the weight of the object using a vertical component of the acceleration of the object, gravitational acceleration, and the upper and lower pressing forces.

11 Claims, 3 Drawing Sheets

(56) References Cited

U.S. PATENT DOCUMENTS

| | | | |
|---|---|---|---|
| 2014/0230581 A1* | 8/2014 | Nakatani | B25J 13/085 73/865 |
| 2014/0316573 A1* | 10/2014 | Iwatake | B25J 9/1694 700/258 |

FOREIGN PATENT DOCUMENTS

| | | | |
|---|---|---|---|
| JP | 07186083 A | * | 7/1995 |
| JP | 2004025387 A | * | 1/2004 |
| JP | 2005161507 A | * | 6/2005 |
| JP | 2006136983 A | * | 6/2006 |
| JP | 2007276112 A | * | 10/2007 |
| JP | 2008207304 A | * | 9/2008 |
| JP | 2010076074 A | * | 4/2010 |
| JP | 2011235374 A | * | 11/2011 |
| KR | 10-1997-0033628 A | | 7/1997 |
| KR | 10-1999-0059516 | | 7/1999 |
| KR | 10-0846743 | | 7/2008 |
| KR | 10-1360450 B1 | | 2/2014 |
| KR | 10-1438968 B1 | | 9/2014 |
| WO | WO 2009088828 A1 * | 7/2009 | ............. B25J 9/1633 |

OTHER PUBLICATIONS

Becedas, Jonathan et al., "Two-flexible-fingers gripper force feedback control system for its application as end effector on a 6-DOF manipulator", IEEE Transactions on Robotics, vol. 27 No. 3, Jun. 2011, pp. 599ff.*

Studywolf blog, "Robot control part 2_Jacobians, velocity, and force", Sep. 2, 2013, 12 pages.*

Winkler, Alexander et al., "Dynamic force/torque measurement using a 12DOF sensor", Proceedings of the 2007 IEEE/RSJ International Conference on Intelligent Robots and Systems, San Diego, CA, USA, Oct. 29-Nov. 2, 2007, paper WeB4.2.*

* cited by examiner

METHOD AND SYSTEM FOR CALCULATING WEIGHT AND CENTER OF GRAVITY OF OBJECT LIFTED BY ROBOT

CROSS REFERENCE TO RELATED APPLICATION

The present application claims priority to and the benefit of Korean Patent Application No. 10-2014-0070965, filed on Jun. 11, 2014, the entire contents of which is incorporated herein for all purposes by this reference.

BACKGROUND

1. Technical Field

The present disclosure relates, in general, to a system for calculating weight and center of gravity of an object lifted by a robot and a method of controlling the same, capable of accurately calculating the weight and the center of gravity of an arbitrary object held and carried by the robot.

2. Description of the Related Art

With respect to industrial robots used to conduct preset operations, it is not necessary to know the weights of objects held by grippers of the industrial robots. However, in the case of intelligent robots or wearable robots, it is necessary to know the weights and the centers of gravity of objects to be manipulated so as to prevent the intelligent robots or wearable robots from losing their balance due to the objects.

In existing technologies, the weight and center of gravity of an object are adapted to be measured by a separate measuring device and to be input for control of a robot. However, to improve this process, in the present disclosure, a robot grasps a desired object, and slightly lifts the object to detect the weight and center of gravity of the object, and information relating to the weight and the center of gravity of the object are applied to the operation of the robot.

The foregoing is intended merely to aid the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a system for calculating the weight and center of gravity of an object for a robot and a method of controlling the same, capable of accurately calculating the weight and center of gravity of an arbitrary object held and carried by the robot.

In order to achieve the above object, according to an aspect of the present disclosure, there is provided a method of controlling a system for calculating weight and center of gravity of an object to be lifted by a robot, which includes: pressing respective upper and lower surfaces of the object by upper and lower parts of a gripper of the robot to grip the object; lifting the object held in the gripper; measuring a change in the angle of each joint during lifting of the object via an angle sensor provided in each joint of the gripper, and calculating angular velocity and angular acceleration of each joint; calculating, via a controller, acceleration of the object using the angular velocity, the angular acceleration, and a Jacobian matrix of the gripper; measuring an upper pressing force with which the upper part of the gripper presses the upper surface of the object and a lower pressing force with which the lower part of the gripper presses the lower surface of the object using force sensors installed on the joints; and calculating, via the controller, the weight of the object using a vertical component of the acceleration of the object, gravitational acceleration, and the upper and lower pressing forces.

The controller may calculate the acceleration of the object via the following equation:

$$\ddot{x} = \dot{J}\dot{\theta} + J\ddot{\theta}$$

where $\ddot{x}$=the acceleration of the object, $J$=the Jacobian matrix of the gripper, and $\theta$=the angle of each joint of the gripper.

Further, the controller may calculate the weight of the object via the following equation:

$$m = \frac{R_B - R_A}{a_y + g}$$

where m=the weight of the object, $R_A$=the upper pressing force, $R_B$=the lower pressing force, $a_y$=the vertical component of the acceleration of the object, and g=the gravitational acceleration.

Furthermore, when $a_y < k_1 \times g$, where $a_y$ is the vertical component of the acceleration of the object, $k_1$ is a setting coefficient, and g is the gravitational acceleration, the controller may calculate the weight of the object via the following equation:

$$m = \frac{R_B - R_A}{g}$$

where m=the weight of the object, $R_A$=the upper pressing force, $R_B$=the lower pressing force, and g=the gravitational acceleration.

Meanwhile, the method may further include: calculating, via the controller, an angular acceleration at which the object rotates around the center of gravity from positional changes of points at which the upper and lower parts of the gripper come into contact with the respective upper and lower surfaces of the object; and calculating, via the controller, the center of gravity of the object from the calculated weight of the object, the calculated angular acceleration, the calculated upper and lower pressing forces, and positions of the points at which the upper and lower parts of the gripper come into contact with the respective upper and lower surfaces of the object.

The controller may calculate the center of gravity of the object via the following equation:

$$-\frac{1}{12}m\alpha r_G^2 + (R_A - R_B)r_G + (-R_A r_A + R_B r_B) = 0$$

where m=the weight of the object, $\alpha$=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

Further, when $\alpha < k_2$, where $\alpha$ is the angular acceleration of the object, and $k_2$ is a setting coefficient, the controller calculates the center of gravity of the object via the following equation:

$$r_G = \frac{(R_A r_A - R_B r_B)}{(R_A - R_B)}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

According to another aspect of the present disclosure, there is provided a system for calculating the weight and center of gravity of an object lifted by a robot, which includes: an upper and a lower part of a robot gripper made up of joints and links; drivers and angular sensors provided for the joints of the gripper; force sensors that are provided for the joints of the gripper and measure an upper pressing force with which the upper part presses an upper surface of the object and a lower pressing force with which the lower part presses a lower surface of the object; and a controller that i) controls the drivers such that the upper and lower parts of the gripper press the respective upper and lower surfaces of the object to grip and lift the object, ii) calculates angular velocity and angular acceleration of each joint using a change in angle of each joint, iii) calculates acceleration of the object using the angular velocity, the angular acceleration, and a Jacobian matrix of the gripper, and iv) calculates the weight of the object using a vertical component of the acceleration of the object, gravitational acceleration, and the upper and lower pressing forces.

The controller may calculate the weight of the object via the following equation:

$$m = \frac{R_B - R_A}{a_y + g}$$

where m=the weight of the object, $R_A$=the upper pressing force, $R_B$=the lower pressing force, $a_y$=the vertical component of the acceleration of the object, and g=the gravitational acceleration.

Further, when $a_y < k_1 \times g$, where $a_y$ is the vertical component of the acceleration of the object, $k_1$ is a setting coefficient, and g is the gravitational acceleration, the controller may calculate the weight of the object via the following equation:

$$m = \frac{R_B - R_A}{g}$$

where m=the weight of the object, $R_A$=the upper pressing force, $R_B$=the lower pressing force, and g=the gravitational acceleration.

Furthermore, the controller may calculate an angular acceleration at which the object rotates around the center of gravity from positional changes of points at which the upper and lower parts of the gripper come into contact with the respective upper and lower surfaces of the object, and calculate the center of gravity of the object from the calculated weight of the object, the calculated angular acceleration, the calculated upper and lower pressing forces, and positions of the points at which the upper and lower parts of the gripper come into contact with the respective upper and lower surfaces of the object.

Also, the controller may calculate the center of gravity of the object via the following equation:

$$-\frac{1}{12} m a r_G^2 + (R_A - R_B) r_G + (-R_A r_A + R_B r_B) = 0$$

where m=the weight of the object, $\alpha$=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

In addition, when $\alpha < k_2$, where $\alpha$ is the angular acceleration of the object, and $k_2$ is a setting coefficient, the controller may calculate the center of gravity of the object via the following equation:

$$r_G = \frac{(R_A r_A - R_B r_B)}{(R_A - R_B)}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

According to the system for calculating weight and center of gravity of an object for a robot, which has the aforementioned structure, and the method of controlling the same, it is possible to accurately calculate the weight and the center of gravity of an arbitrary object held and carried by the robot. Further, by calculating the weight and the center of gravity of the object, the robot can carry out stable and precise operations involving the object.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE EMBODIMENTS

Hereinbelow, preferred embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

Figure 1:
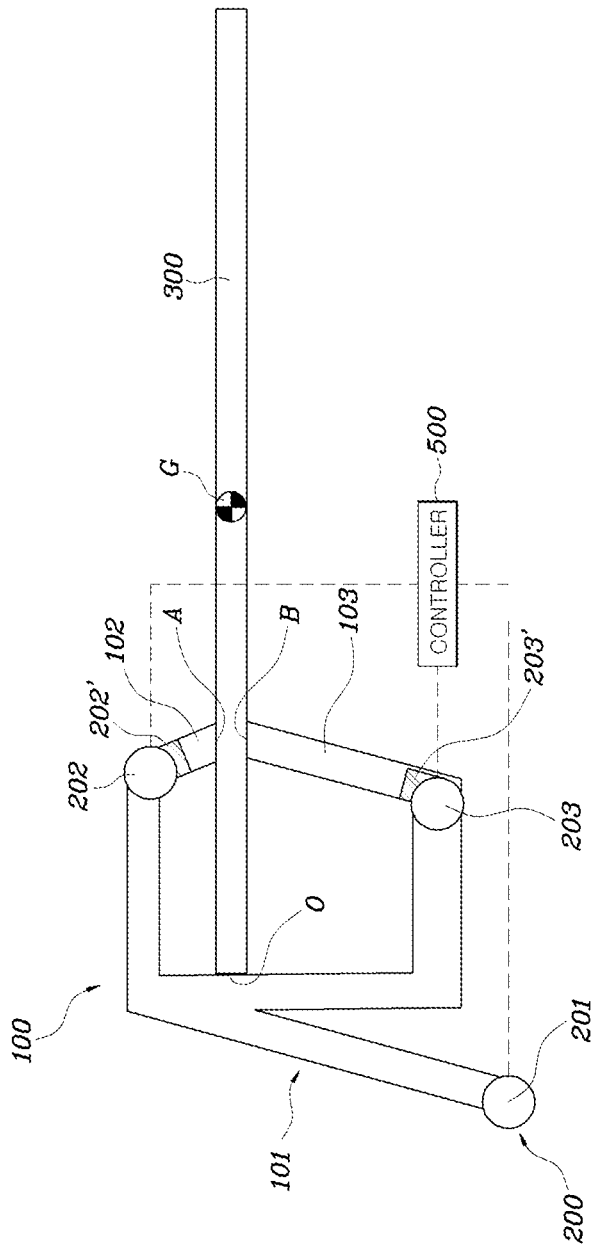
FIGS. 1 and 2 illustrate a configuration of a system for calculating the weight and the center of gravity of an object lifted by a robot according to an embodiment of the present disclosure.
Figure 2:
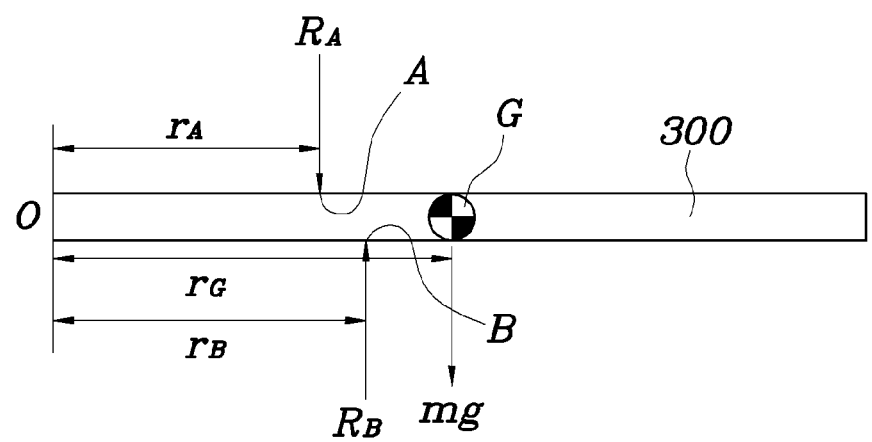
Figure 3:
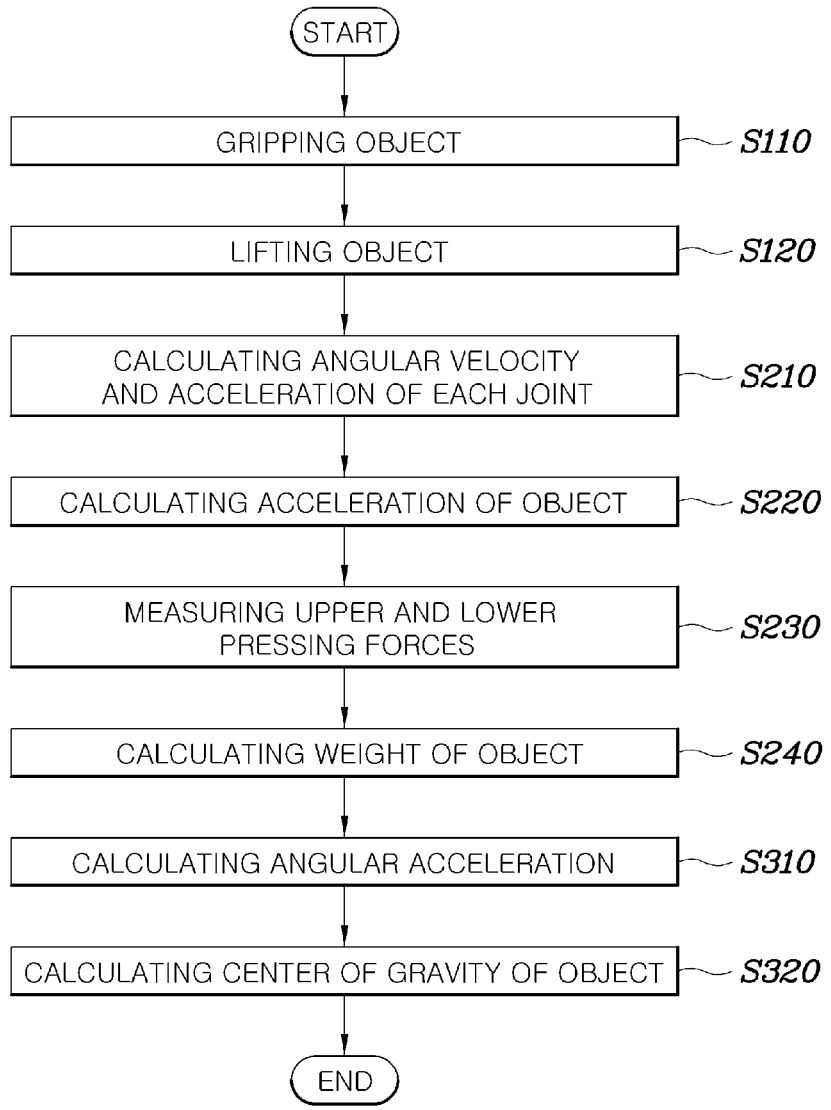
FIG. 3 is a flow chart for a method of controlling the system for calculating the weight and the center of gravity of an object lifted by a robot according to an embodiment of the present disclosure.

FIGS. 1 and 2 illustrate a configuration of a system for calculating the weight and the center of gravity of an object lifted by a robot according to an embodiment of the present disclosure, and FIG. 3 is a flow chart for a method of controlling the system for calculating the weight and the center of gravity of an object lifted by a robot according to an embodiment of the present disclosure.

A method of controlling a system for calculating the weight and the center of gravity of an object lifted by a robot according to an embodiment of the present disclosure includes: a process S110 of pressing respective upper and lower surfaces of an object via upper and lower parts of a gripper of the robot to grip the object; a process S120 of lifting the object with the gripper; a process S210 of measuring, during the lifting of an object, a change in the angle of each joint through an angle sensor provided in each joint of the gripper, and calculating angular velocity and acceleration of each joint; a process S220 calculating via a controller acceleration of the object using the angular velocity, the angular acceleration, and a Jacobian matrix of the gripper; a process S230 of measuring an upper pressing force with which the upper part of the gripper presses the upper surface of the object and a lower pressing force with which the lower part of the gripper presses the lower surface of the object using force sensors installed on the joints; and a process S240 calculating via the controller the weight of the object using a vertical component of the acceleration of the object, gravitational acceleration, and the upper and lower pressing forces.

Referring to FIGS. 1 and 2, in the configuration of a system for calculating the weight and the center of gravity of an object lifted by a robot according to an embodiment of the present disclosure, the robot has a gripper made up of numerous links 100, each of which is coupled by a joint 200. The joint is provided with an encoder type angular sensor for detecting a rotational angle, along with a driver motor. In the case of the illustrated embodiment, the gripper is provided with a base link 101, and the object 300 is gripped such that an end thereof comes into contact with the base link 101. A point of the contact is set to a starting point O.

Meanwhile, the base link 101 is provided with upper and lower parts 102 and 103 that act as links and are connected by joints 202 and 203. Angular sensors are provided for the joints of the base link 101, the upper part 102, and the lower part 103, and detect rotational angles so as to be able to kinematically detect a position of each component of the gripper.

The force sensors 202' and 203' are provided for the joints of the upper and lower parts 102 and 103 so as to be able to measure the pressing forces when the upper and lower parts 102 and 103 come into contact with the object 300 and are applied to the object 300. If each force sensor is a 2-axis sensor, each pressing force can be divided into a vertical component and a horizontal component.

To be specific, referring to FIG. 3, in a method of controlling the system for calculating the weight and the center of gravity of an object to be lifted by a robot according to an embodiment of the present disclosure, the upper and lower parts of the gripper of the robot press the respective upper and lower surfaces of the object to grip the object (S110), and the gripper lifts the object (S120).

As illustrated in FIG. 1, the upper and lower parts 102 and 103 of the gripper are manipulated to grip the object 300 such that the end of the object comes into contact with the base link. The contact point is set to the starting point O. The upper part 102 comes into contact with and presses the upper surface of the object 300, and the lower part 103 comes into contact with and presses the lower surface of the object 300. Points at which the upper and lower parts 102 and 103 come into contact with the object 300 may be changed according to a thickness of the object 300.

When the object is lifted, a change in angle of each of the joints 201, 202 and 203 of the gripper is measured by the angular sensor provided for each joint, and the controller 500 calculates the angular velocity and angular acceleration of each joint (S210). Sufficient data can be obtained if the object is briefly fluctuated during lifting.

In other words, knowing the angle of each joint makes it possible to know the angular velocity and acceleration of each joint. Finally, the points A and B at which ends of the upper and lower parts are located can be kinematically calculated with accuracy from the angle formed by each angle in a stopped state.

Meanwhile, the controller calculates acceleration of the object using the angular velocity, the angular acceleration, and the Jacobian matrix of the gripper (S220). In detail, the controller can calculate the acceleration of the object from the following equation.

$$\ddot{x} = J\dot{\theta} + \dot{J}\ddot{\theta} \qquad \text{Equation 1}$$

Where $\ddot{x}$=the acceleration of the object, J=the Jacobian matrix of the gripper, and $\theta$=the angle of each joint of the gripper.

The acceleration of the object can be found through the Jacobian relation, and a relation between the position of the end of the gripper and the angle of each joint can be expressed by the following equation.

$$\dot{x} = J\dot{\theta} \qquad \text{Equation 2}$$

As above, a matrix composed of angular vectors of the robot joints can be derived as a matrix for the position of the end of the gripper using the Jacobian matrix previously identified with the gripper. When differential is performed using such a relation, the acceleration of the end of the gripper can be found as in Equation 1, and corresponds to the acceleration of the object moving together with the end of the gripper.

Thereafter, the upper pressing force with which the upper part of the gripper presses the upper surface of the object and the lower pressing force with which the lower part of the gripper presses the lower surface of the object are measured by the force sensors provided for the respective joints (S230).

Then, the controller calculates the weight of the object using the vertical component of the acceleration of the object, the gravitational acceleration, and the upper and lower pressing forces (S240).

To be specific, in process S240, the controller can calculate the weight of the object from the following equation.

$$m = \frac{R_B - R_A}{a_y + g} \qquad \text{Equation 3}$$

where m=the weight of the object, $R_A$=the upper pressing force, $R_B$=the lower pressing force, $a_y$=the vertical component of the acceleration of the object, and g=the gravitational acceleration.

Referring to FIG. 2, the following balance equation of force can be obtained.

$$\Sigma F_y = R_B - R_A - mg = ma_y \quad \text{Equation 4}$$

Arrangement of the above equation makes it possible to find the weight of the object as in Equation 3. Meanwhile, when $a_y < k_1 \times g$ (where $a_y$ indicates the vertical component of the acceleration of the object, $k_1$ indicates the setting coefficient, and g indicates the gravitational acceleration) in the process of calculating the weight of the object, the controller can calculate the weight of the object from the following equation.

$$m = \frac{R_B - R_A}{g} \quad \text{Equation 5}$$

where m=the weight of the object, $R_A$=the upper pressing force, $R_B$=the lower pressing force, and g=the gravitational acceleration.

In other words, if the vertical component of the acceleration of the object has a value close to zero (0), it is ignored, and the weight of the object can be derived as in Equation 5. In this case, only the pressing forces of the upper and lower parts of the gripper are measured to find the weight of the object.

Meanwhile, in finding the center of gravity of the object, the controller calculates an angular acceleration at which the object rotates around the center of gravity from the positional changes of the points at which the upper and lower parts of the gripper come into contact with the respective upper and lower surfaces of the object (S310).

In other words, in tracking the positions of the ends of the upper and lower parts of the gripper as in FIG. 2, a degree to which the object itself is inclined can be calculated, and thus an angle at which the object itself rotates can be found. The angle is differentiated with respect to time, deriving the angular acceleration at which the object rotates.

Then, the controller calculates the center of gravity of the object from the calculated weight of the object, the calculated angular acceleration, the calculated upper and lower pressing force, and the positions of the points at which the upper and lower parts of the gripper come into contact with the respective upper and lower surfaces of the object (S320).

In detail, the controller calculates the center of gravity of the object from the following equation in the process of calculating the center of gravity of the object.

$$-\frac{1}{12}mar_G^2 + (R_A - R_B)r_G + (-R_A r_A + R_B r_B) = 0 \quad \text{Equation 6}$$

where m=the weight of the object, $\alpha$=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

In FIG. 2, a balance relation between moments can be arranged by the following equation.

$$\Sigma M_G: \vec{GA} \times R_A - \vec{GB} \times R_B = J_G \alpha$$

$$(r_B - r_A)R_A - (r_G - r_B)R_B = J_G \alpha \quad \text{Equation 7}$$

In other words, the sum of moments based on a rotational angle at a virtual center of gravity and the moment of inertia of the object is balanced with moments of the upper and lower parts caused by an external force. Assuming that the object has a rectangular cross section in this process, the moment of inertia of the object is as follows.

$$J_G = \frac{1}{12}mr_G^2 \quad \text{Equation 8}$$

Thus, in combining Equations 7 and 8, the quadratic equation of Equation 6 is derived, and solutions of the quadratic equation are just a position of the center of gravity of the object. Here, of the two solutions of the quadratic equation, the one that is greater than zero and is suitable in view of a length of the object can be selected as the position of the center of gravity.

Meanwhile, in the process of calculating the center of gravity of the object, when $\alpha < k_2$ (where $\alpha$=the angular acceleration of the object, and $k_2$=the setting coefficient), the controller can calculate the center of gravity of the object from the following equation.

$$r_G = \frac{(R_A r_A - R_B r_B)}{(R_A - R_B)} \quad \text{Equation 9}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

In other words, when the angular acceleration of the object is close to zero (0), it can be neglected to form a conclusion as in Equation 9.

Further, a system for calculating the weight and center of gravity of an object lifted by a robot according to the present disclosure includes: upper and lower parts 102 and 103 of a robot gripper made up of joints 200 and links 100; drivers and angular sensors provided for the joints 202 and 203 of the gripper; force sensors 202' and 203' that are provided for the joints of the gripper and measure an upper pressing force with which the upper part 102 presses an upper surface of the object 300 and a lower pressing force with which the lower part 103 presses a lower surface of the object 300; and a controller 500 that i) controls the drivers such that the upper and lower parts 102 and 103 of the gripper press the respective upper and lower surfaces of the object 300 to grip and lift the object 300, ii) calculates angular velocity and acceleration of each joint using a change in angle of each joint, iii) calculates acceleration of the object 300 using the angular velocity, the angular acceleration, and a Jacobian matrix of the gripper, and iv) calculates the weight of the object 300 using a vertical component of the acceleration of the object 300, gravitational acceleration, and the upper and lower pressing forces.

The controller 500 can calculate the weight of the object 300 from Equation 3 below.

$$m = \frac{R_B - R_A}{a_y + g} \quad \text{Equation 3}$$

where m=the weight of the object, $R_A$=the upper pressing force, $R_B$=the lower pressing force, $a_y$=the vertical component of the acceleration of the object, and g=the gravitational acceleration.

Further, when $a_y \ll k_1 \times g$ (where $a_y$ is the vertical component of the acceleration of the object, $k_1$ is the setting coefficient, and g is the gravitational acceleration), the controller 500 can calculate the weight of the object 300 from Equation 5 below.

$$m = \frac{R_B - R_A}{g} \quad \text{Equation 5}$$

where m=the weight of the object, $R_A$=the upper pressing force, $R_B$=the lower pressing force, and g=the gravitational acceleration.

Meanwhile, the controller 500 may calculate an angular acceleration at which the object 300 rotates around the center of gravity G from positional changes of points A and B at which the upper and lower parts 102 and 103 of the gripper come into contact with the respective upper and lower surfaces of the object 300, and calculate the center of gravity G of the object from the calculated weight of the object, the calculated angular acceleration, the calculated upper and lower pressing forces, and positions of the points A and B at which the upper and lower parts 102 and 103 of the gripper come into contact with the respective upper and lower surfaces of the object 300.

In detail, the controller 500 can calculate the center of gravity G of the object 300 from Equation 6 below.

$$-\frac{1}{12} m \alpha r_G^2 + (R_A - R_B) r_G + (-R_A r_A + R_B r_B) = 0 \quad \text{Equation 6}$$

where m=the weight of the object, α=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

When $\alpha \ll k_2$ (where α is the angular acceleration of the object, and $k_2$ is the setting coefficient), the controller 500 can calculate the center of gravity G of the object 300 from Equation 9 below.

$$r_G = \frac{(R_A r_A - R_B r_B)}{(R_A - R_B)} \quad \text{Equation 9}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

According to the system for calculating weight and center of gravity of an object for a robot, which has the aforementioned structure, and the method of controlling the same, it is possible to accurately calculate the weight and the center of gravity of an arbitrary object held and carried by the robot. Further, by calculating the weight and the center of gravity of the object, the robot can carry out stable and precise operations when manipulating the object.

Although certain embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A method of controlling a system for calculating weight and/or center of gravity of an object for a robot, the method comprising:
    pressing respective upper and lower surfaces of the object via upper and lower parts of a robotic gripper to grip the object;
    lifting the object with the gripper;
    measuring, during lifting of the object, a change in angle of each joint of the gripper through an angle sensor provided for each joint of the gripper and calculating angular velocity and angular acceleration of each joint;
    calculating, via a controller, acceleration of the object using the angular velocity, the angular acceleration and a Jacobian matrix of the gripper;
    measuring an upper pressing force with which the upper part of the gripper presses the upper surface of the object and a lower pressing force with which the lower part of the gripper presses the lower surface of the object using force sensors installed on the joints;
    calculating, via the controller, the weight of the object using a vertical component of the acceleration of the object, a gravitational acceleration and the upper and lower pressing forces;
    calculating, via the controller, an angular acceleration at which the object rotates around the center of gravity from positional changes of points at which the upper and lower parts of the gripper come into contact with the respective upper and lower surfaces of the object; and
    calculating, via the controller, the center of gravity of the object from the calculated weight of the object, the calculated angular acceleration, the calculated upper and lower pressing forces, and positions of the points at which the upper and lower parts of the gripper come into contact with the respective upper and lower surfaces of the object.

2. The method according to claim 1, wherein the controller calculates the acceleration of the object via the following equation:

$$\ddot{x} = \dot{J}\dot{\theta} + J\ddot{\theta}$$

where $\ddot{x}$=the acceleration of the object, J=the Jacobian matrix of the gripper, and θ=the angle of each joint of the gripper.

3. The method according to claim 1, wherein the controller calculates the weight of the object via the following equation:

$$m = \frac{R_B - R_A}{a_y + g}$$

where m=the weight of the object, $R_A$=the upper pressing force, $R_B$=the lower pressing force, $a_y$=the vertical component of the acceleration of the object, and g=the gravitational acceleration.

4. The method according to claim 1, wherein, when $a_y \ll k_1 \times g$, where $a_y$ is the vertical component of the acceleration of the object, $k_1$ is a setting coefficient, and g is the gravitational acceleration, the controller calculates the weight of the object via the following equation:

$$m = \frac{R_B - R_A}{g}$$

where m=the weight of the object, $R_A$=the upper pressing force, $R_B$=the lower pressing force, and g=the gravitational acceleration.

5. The method according to claim 1, wherein the controller calculates the center of gravity of the object via the following equation:

$$-\frac{1}{12}mar_G^2 + (R_A - R_B)r_G + (-R_A r_A + R_B r_B) = 0$$

where m=the weight of the object, α=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

6. The method according to claim 1, wherein, when α<$k_2$, where α is the angular acceleration of the object, and $k_2$ is a setting coefficient, the controller calculates the center of gravity of the object in the process of calculating the center of gravity of the object via the following equation:

$$r_G = \frac{(R_A r_A - R_B r_B)}{(R_A - R_B)}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

7. A system for calculating weight and/or center of gravity of an object for a robot, the system comprising:
an upper part and a lower part of a robot gripper made up of joints and links;
drivers and angular sensors provided for the joints of the gripper;
force sensors that are provided for the joints of the gripper and measure an upper pressing force with which the upper part presses an upper surface of the object and a lower pressing force with which the lower part presses a lower surface of the object; and
a controller that i) controls the drivers such that the upper and lower parts of the gripper press the respective upper and lower surfaces of the object to grip and lift the object, ii) calculates angular velocity and angular acceleration of each joint of the gripper using a change in angle of each joint of the gripper, iii) calculates acceleration of the object using the angular velocity, the angular acceleration, and a Jacobian matrix of the gripper, and iv) calculates the weight of the object using a vertical component of the acceleration of the object, gravitational acceleration, and the upper and lower pressing forces,
wherein the controller calculates an angular acceleration at which the object rotates around the center of gravity from positional changes of points at which the upper and lower parts of the gripper come into contact with the respective upper and lower surfaces of the object, and calculates the center of gravity of the object from the calculated weight of the object, the calculated angular acceleration, the calculated upper and lower pressing forces, and positions of the points at which the upper and lower parts of the gripper come into contact with the respective upper and lower surfaces of the object.

8. The system according to claim 7, wherein the controller calculates the weight of the object via the following equation:

$$m = \frac{R_B - R_A}{a_y + g}$$

where m =the weight of the object, $R_A$=the upper pressing force, $R_B$=the lower pressing force, $a_y$=the vertical component of the acceleration of the object, and g=the gravitational acceleration.

9. The system according to claim 7, wherein, when $a_y$<$k_1$× g, where $a_y$ is the vertical component of the acceleration of the object, $k_1$ is a setting coefficient, and g is the gravitational acceleration, the controller calculates the weight of the object via the following equation:

$$m = \frac{R_B - R_A}{g}$$

where m=the weight of the object, $R_A$=the upper pressing force, $R_B$=the lower pressing force, and g=the gravitational acceleration.

10. The system according to claim 7, wherein the controller calculates the center of gravity of the object via the following equation:

$$-\frac{1}{12}mar_G^2 + (R_A - R_B)r_G + (-R_A r_A + R_B r_B) = 0$$

where m=the weight of the object, α=the angular acceleration of the object, $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

11. The system according to claim 7, wherein, when α<$k_2$, where α is the angular acceleration of the object, and $k_2$ is a setting coefficient, the controller calculates the center of gravity of the object via the following equation:

$$r_G = \frac{(R_A r_A - R_B r_B)}{(R_A - R_B)}$$

where $r_G$=the center of gravity of the object, $R_A$=the upper pressing force, $R_B$=the lower pressing force, $r_A$=the position at which the upper part of the gripper comes into contact with the upper surface of the object, and $r_B$=the position at which the lower part of the gripper comes into contact with the lower surface of the object.

* * * * *